US011082812B2

(12) United States Patent
Holcombe et al.

(10) Patent No.: US 11,082,812 B2
(45) Date of Patent: Aug. 3, 2021

(54) MULTI-BAND COMMUNICATIONS IN A WIRELESS MESH NETWORK

(71) Applicant: Landis+Gyr Innovations, Inc., Alpharetta, GA (US)

(72) Inventors: Michael Sean Holcombe, Roswell, GA (US); Justin Clifford Matthews, Jr., Arncliffe (AU); Matthew Donald Karlgaard, Nisswa, MN (US); Christopher Sean Calvert, Roswell, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 0 days.

(21) Appl. No.: 16/593,264

(22) Filed: Oct. 4, 2019

(65) Prior Publication Data
US 2020/0112839 A1 Apr. 9, 2020

Related U.S. Application Data

(60) Provisional application No. 62/741,177, filed on Oct. 4, 2018.

(51) Int. Cl.
*H04W 72/04* (2009.01)
*H04W 4/12* (2009.01)
(Continued)

(52) U.S. Cl.
CPC .............. *H04W 4/12* (2013.01); *G01D 4/002* (2013.01); *H04W 8/24* (2013.01);
(Continued)

(58) Field of Classification Search
CPC ..... H04W 4/12; H04W 8/24; H04W 72/0446; H04W 72/0453; H04W 80/02; G01D 4/002
See application file for complete search history.

(56) References Cited

U.S. PATENT DOCUMENTS 9,692,692 B1 *  6/2017  Vairavakkalai ....... H04L 45/025
2013/0121337 A1  5/2013  Nguyen et al.
(Continued)

OTHER PUBLICATIONS

International Patent Application No. PCT/US2019/054701, International Search Report and Written Opinion, dated Jan. 2, 2020, 15 pages.

*Primary Examiner* — Wei Zhao
(74) *Attorney, Agent, or Firm* — Kilpatrick Townsend & Stockton LLP

(57) ABSTRACT

A method is provided to transmit a message over a wireless mesh network. According to the method, a node connects to a second node by a first communications band and a second communications band, such that the node is configured to communicate with the second node over both the first communications band and the second communications band. The node identifies a message for transmission to the second node. The node determines that the second node is capable of receiving the message by way of the first communications band and is capable of receiving the message by way of the second communications band. The node dynamically determines a selected communications band, from the first communications band and the second communications band, to use to transmit the message to the second node over the wireless mesh network. The node transmits the message to the second node over the selected communications band.

20 Claims, 4 Drawing Sheets

(51) Int. Cl.
*G01D 4/00* (2006.01)
*H04W 8/24* (2009.01)
*H04W 80/02* (2009.01)
*H04W 84/18* (2009.01)

(52) U.S. Cl.
CPC ... *H04W 72/0446* (2013.01); *H04W 72/0453* (2013.01); *H04W 80/02* (2013.01); *H04W 84/18* (2013.01)

(56) References Cited

U.S. PATENT DOCUMENTS

| | | |
|---|---|---|
| 2018/0054847 A1 | 2/2018 | Cariou et al. |
| 2018/0132159 A1* | 5/2018 | Strong .................. H04W 24/02 |
| 2018/0183468 A1 | 6/2018 | Emmanuel et al. |
| 2018/0206174 A1 | 7/2018 | Zhou et al. |
| 2020/0059725 A1* | 2/2020 | Maly .................... G05D 1/0202 |

* cited by examiner

MULTI-BAND COMMUNICATIONS IN A WIRELESS MESH NETWORK

CROSS-REFERENCE TO RELATED APPLICATIONS

The present disclosure claims priority to U.S. Provisional Application Ser. No. 62/741,177 for "Multi-Band Communications in a Wireless Mesh Network," filed Oct. 4, 2018, which is incorporated by reference herein in its entirety.

TECHNICAL FIELD

This disclosure generally relates to wireless mesh networks and, more particularly, relates to multi-band communications on a wireless mesh network.

BACKGROUND

Throughput and reliability are important issues for communications on a wireless mesh network. Throughput may be impacted if a node has a pending communication, but cannot access a communications channel. Other nodes may already be using the channel for communication or the channel may be otherwise unavailable. When this happens the node may back off and delay sending the communication. When there are different types of data communicated across the network, the communication of one type of data may impact the communication of another type of data. For example, the communication of a large amount of data, such as a firmware update, may interfere with or delay the communication of other types of data, such as data used to maintain the network. Variable environmental conditions and in-band interference can result in acknowledged communication failures in a wireless network. Improvements to the reliability of communications is beneficial as it helps to minimize retries and maximize range.

SUMMARY

In one implementation, a method is provided to transmit a message over a wireless mesh network of a plurality of peer nodes connected together. According to the method, a node connects to a second node in the wireless mesh network by way of a first communications band and a second communications band, such that the node is configured to communicate with the second node over both the first communications band and the second communications band. The node identifies a message for transmission to the second node. The node determines that the second node is capable of receiving the message by way of the first communications band and is capable of receiving the message by way of the second communications band. The node dynamically determines a selected communications band, from the first communications band and the second communications band, to use to transmit the message to the second node over the wireless mesh network. The node transmits the message to the second node over the selected communications band.

In another implementations, a node includes a first physical layer, a second physical layer, and a media-access control (MAC) layer. The first physical layer includes a first radio configured to communicate with a second node over a first communications band. The second physical layer includes a second radio configured to communicate with the second node over a second communications band. The MAC layer is serviced by both the first physical layer and the second physical layer, and the first radio and the second radio have a common MAC address. The node further includes a processor and a memory, where the processor is configured to execute computer-readable instructions, and the memory is configured to store the computer-readable instructions that, when executed by the processor, cause the processor to perform operations. Such operations include connecting to the second node by way of the first communications band and the second communications band, such that the node is configured to communicate with the second node over both the first communications band and the second communications band. The operations further include identifying a message for transmission to the second node. The operations further include determining that the second node is capable of receiving the message by way of the first communications band and is capable of receiving the message by way of the second communications band. The operations further include dynamically selecting the first communications band, from the first communications band and the second communications band, to use to transmit the message to the second node and transmitting the message to the second node over the first communications band using the first radio.

In yet another implementation, a computer-program product for communicating between nodes of a wireless mesh network includes a computer-readable storage medium having program instructions embodied thereon. The program instructions are executable by a processor to cause the processor to perform a method. According to the method, a node connects to a second node in the wireless mesh network by way of a first communications band and a second communications band, such that the node is configured to communicate with the second node over both the first communications band and the second communications band. Further according to the method, the node identifies a message for transmission to the second node. Further according to the method, the node determines that the second node is capable of receiving the message by way of the first communications band and is capable of receiving the message by way of the second communications band. Further according to the method, the node dynamically determines a selected communications band, from the first communications band and the second communications band, to use to transmit the message to the second node over the wireless mesh network, and the node transmits the message to the second node over the selected communications band.

These illustrative aspects and features are mentioned not to limit or define the presently described subject matter, but to provide examples to aid understanding of the concepts described in this application. Other aspects, advantages, and features of the presently described subject matter will become apparent after review of the entire application.

BRIEF DESCRIPTION OF THE FIGURES

These and other features, aspects, and advantages of the present disclosure are better understood when the following Detailed Description is read with reference to the accompanying drawings.

DETAILED DESCRIPTION

Aspects and examples of the present invention relate to a network device capable of communicating on at least two communications bands using a single MAC address. The device simultaneously uses multiple communications bands to communicate with other devices on the network to improve reliability, improve throughput, or provide full-duplex operations. The selection of the communications band is transparent to the upper layers of the communications stack of the device. Benefits of using multiple communications bands with a single MAC address include interference mitigation and network load balancing. In addition, more endpoints may be supported on a single mesh network, mesh network formation may be faster, and time synchronization may be tighter.

Figure 1:
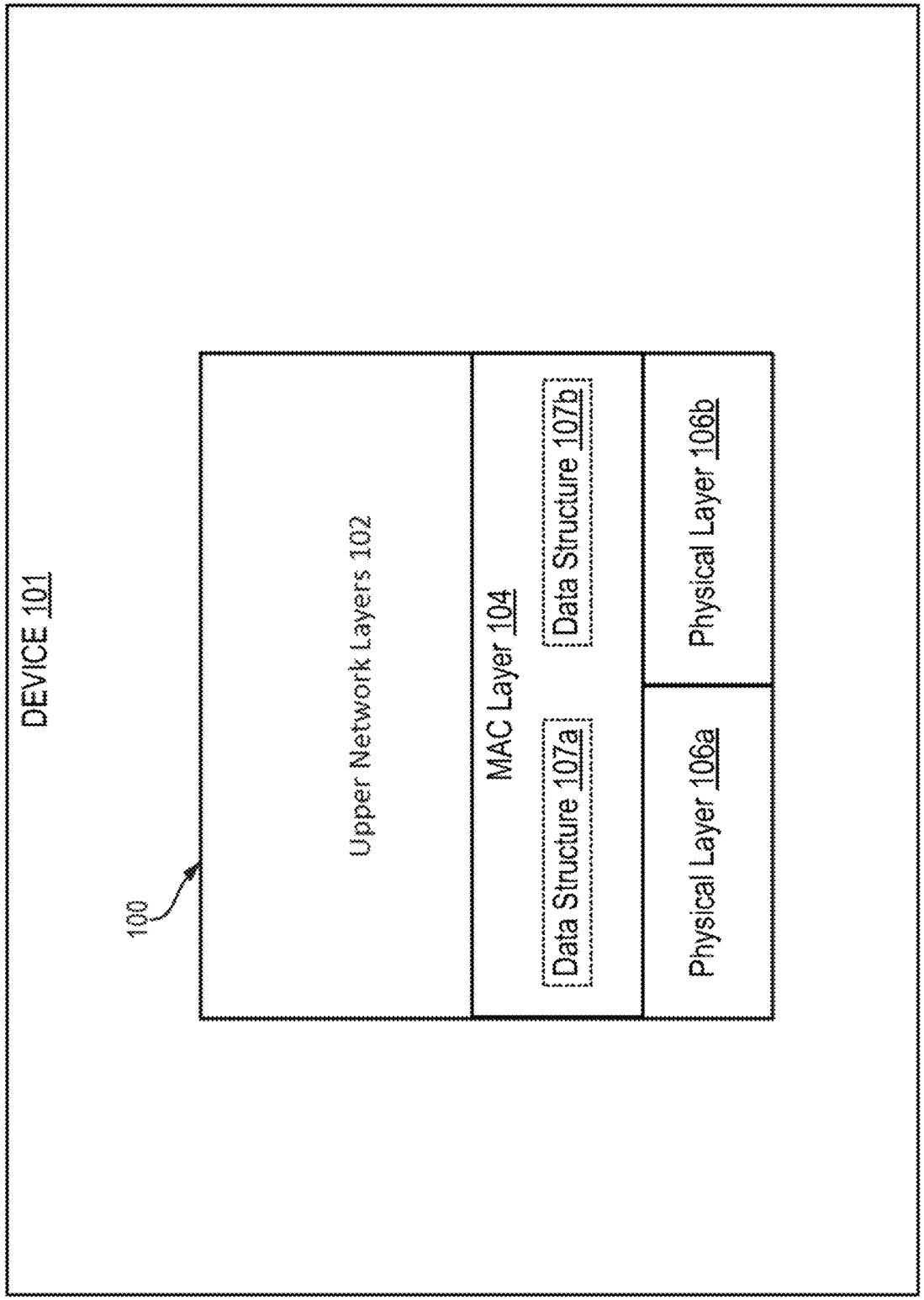
FIG. 1 is a block diagram of a communications stack of a device, according to certain implementations described herein.

FIG. 1 illustrates an example stack, also referred to as a communications stack, for a device 101 that supports two communications bands using a single MAC address. In some implementations, the device 101 is a node (e.g., a computing device) in wireless mesh network. Generally, a wireless mesh network is a communications network made up of peer radio nodes organized into a mesh topology. In some implementations, a wireless mesh network is an ad hoc network, in which nodes join by dynamically connecting to one or more peer nodes already in the wireless mesh network.

In some implementations, the stack 100 includes two physical layers 106, a single MAC layer 104 and various upper layers 102 above the MAC layer 104. In some implementations, for instance, the device 101 follows the Open Systems Interconnection (OSI) communication model, and thus, the upper layers 102 include a network layer, a transport layer, a session layer, a presentation layer, and an application layer. It will be understood by one skilled in the art that the layers described herein are levels of abstraction and that various hardware and software are useable to implement each layer. Each layer, including the physical layers 106 and the MAC layer 104, may provide a service to the layer above, and together, the various layers may enable the device 101 to communicate with other devices. For instance, each physical layer 106 service the MAC layer 104 by transmitting frames as requested by the MAC layer 104.

In some implementations, each physical layer 106 is configured to communicate on a different communications band, and further, each physical layer 106 may be implemented as a distinct radio. Thus, an example device 101 has two hardware radios, each acting as a distinct physical layer 106 in the stack 100. In one example, a first physical layer 106a communicates on a 2.4 GHz band, and a second physical layer 106b communicates on a 900 MHz band. In another example, the first physical layer 106a communicates on a 5.8 GHz band, and the second physical layer 106b communicates on a 433 MHz band. Other communications bands may be used in other systems. Although FIG. 1 illustrates two physical layers 106, other devices 101 may use more than two physical layers 106. A device 101 that uses a single MAC layer 104 and multiple physical layers 106 in a single stack 100 is less costly than a device with multiple stacks 100.

In some implementations, the MAC layer 104 provides the upper layers 100 with access to the physical layers 106. Since there is a single MAC layer 104, the device 101 has a single MAC address that is used for communications via any of the communications bands supported by the physical layers 106. According to some implementations, the MAC layer 104 described herein has advantages over conventional MAC layers. For instance, each physical layer 106 (e.g., each radio) registers with the MAC layer 104, enabling the MAC layer 104 to be aware of both physical layers 106. The MAC layer 104 implements logic, as described herein, to distribute frames across the available physical layers 106. For instance, the MAC layer 140 includes logic to determine which physical layers 106 to use for transmission of each frame (i.e., data to be transmitted) as described herein.

At startup, each of the physical layers 106 registers with the MAC layer 104. The MAC layer 104 creates an instance of a data structure 107 for each physical layer 106 and assigns each physical layer 106 a handle. For instance, the MAC layer 104 may associate a first data structure 107a with the first physical layer 106a and a second data structure 107b with the second physical layer 106b. For each physical layer 106, the respective data structure 107 may provide to the MAC layer 104 information about that physical layer 106. For instance, an example of such a data structure 107 includes one or more frame buffers, state variables, and status indicators accessible by the MAC layer 104 to enable use of the corresponding physical layer 106. When the device 101 receives a frame, the MAC layer 104 uses the handle to determine which physical layer 106 received the frame. For each physical layer 106, the respective handle may be a pointer to the respective data structure 107. When a new frame arrives at a physical layer 106, the physical layer 106 sends a notification message to the MAC layer 104, where the notification message includes the handle corresponding to the physical layer 106. Thus, the MAC layer 104 may utilize the handle to access the data structure 107 and, thus, to update the status of the physical layer 106 that received the new frame.

Upon receiving data to transmit to another device from the upper layers, the MAC layer 104 determines which communications band to use or determines that it will use multiple communications bands. The determination may be based on a mode of operation. In one example, the modes of operation include: 1) selection diversity mode, 2) high reliability mode, and 3) high throughput mode. In some implementations, the mode of the device 101 is dynamic. In other implementations, however, the mode of the device is fixed or manually changeable. In either case, the device 101 may dynamically determine how to transmit messages based in part on the current mode of the device 101.

When determining which one of multiple communications bands to use or determining that multiple communications bands may be used, the transmitting device 101 may consider the capabilities of the receiving device. A device 101 may maintain information about its neighboring nodes, including information that indicates whether a neighboring node supports multiple communications bands. This information may be based on the device 101 previously hearing a communication from a neighboring device on one or more of the communications bands.

In selection diversity mode, when the destination device (i.e., the receiving device) supports multiple communications bands, the MAC layer 104 selects one of the communications bands for communication of a complete frame with the destination device. The MAC layer 104 may consider the LQI (link quality indicator) of the channels, channel access latency (i.e., availability of the channels), S/N (signal to noise) ratio, channel access time (i.e., transmit time), receiver noise floor, output power, failure rate, link budget, or other factors when selecting one of the communications bands. Different factors may be used or weighted differently for different use cases.

In high reliability mode, when the destination device supports multiple communications bands, the MAC layer 104 uses multiple communications bands for communicating the same information to the destination device. The device 101 communicates the same frame on the multiple communications bands. Thus, at least a portion of the message, and potentially the entire message, is transmitted over multiple communications bands.

In high throughput mode, when the destination device supports multiple communications bands, the MAC layer 104 splits the information to be communicated to the destination device into multiple pieces and transmits the pieces across the multiple communications bands at the same time. The device 101 communicates a separate piece of a single frame on each communications band.

A device 101 may be configured so that each communications band operates using one of the modes or the device 101 may determine an operational mode based on minimizing or otherwise reducing the amount of air time used by the communications/mode combination. For instance, the MAC layer 104 may reduce the potential air time of a transmission (i.e., the duration of the transmission) by transmitting a message as frames across two physical layers 106 (e.g., across two communications bands) simultaneously or by selecting the physical layer 106 with a stronger radio link.

The device 101 may use the multiple communications bands to improve reliability or throughput of network traffic or otherwise improve the operations of the network. The following describes some exemplary scenarios. Although the scenarios are described separately, two or more of scenarios may be implemented to operate together and may be combined with additional scenarios.

Selection Diversity Mode Scenarios

In selection diversity mode, a device 101 uses multiple communications bands. In one example, when the MAC layer 104 of a device (device A) has a frame to communicate to a destination device (device B), the MAC layer 104 selects the communications band that is most suitable for the communication of the frame.

Device A may be configured to primarily use a first communications band for communicating with device B. However, if device A determines that the first communications band is busy, then it may use the second communications band to send the frame to device B, assuming that device B supports both communications band.

In the case where neither communications bands is busy, device A may consider transmission time. For example, device A may be configured to transmit no more than a predetermined amount of time over a predetermined time period on a single communications band, such as transmit no more than 0.4 seconds over a 20 second period on the first communications band. In this example, device A may select the second communications band once it has already used the first communications band for 0.4 seconds of a 20 second period.

The physical layers 106 may support full duplex communication at the MAC layer 104 by using one physical layer 106 for transmitting while another physical layer 106 is used for receiving. For example, device A may transmit a frame to device B using a first communications band and a first physical layer 106, while at the same time device A receives a frame from device B using a second communications band and a second physical layer 106. To this end, for instance, within a given time slot (i.e., a time interval, potentially for which a radio channel may be predetermined for use during the time interval), the MAC layer 104 may utilize a first physical layer 106a for transmissions and may be open to receiving transmissions through a second physical layer 106b. When the time slot ends and a new time slot begins, the MAC layer 104 may switch the two physical layers 106, such that transmissions are sent by way of the second physical layer 106b and received by way of the first physical layer 106a.

Figure 2:
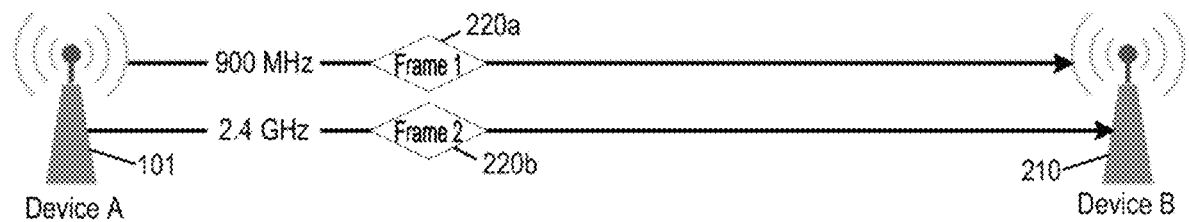
FIG. 2 illustrates an example of transmitting a message where frames of the message are distributed over multiple communications bands, according to certain implementations described herein.

FIG. 2 illustrates an example where multiple communications bands may be used to communicate multiple frames 220 to another device, such as a second node 210 in a wireless mesh network 205, and thus improve the throughput of the network. Different frames 220 are sent on different communications bands. When there are two communications bands, as shown in FIG. 2, a first frame 220a is sent on the first communications band and a second frame 220b is sent on the second communications band.

In this example, the frames 220 may be transmitted to the same receiving device or the frames 220 may be transmitted to different receiving devices. FIG. 2 illustrates that both frames 220 are transmitted to device B. However, the first frame 220a may be sent to device B on the first communications band and the second frame 220b may be sent to device C on the second communications band.

When the MAC layer 104 of device A is ready to send the first frame 220a, it may select the first physical layer 106a based on an assessment of the available physical layers 106 or communications bands. If the MAC layer 104 of device A has a second frame 220b ready for transmission while the first frame 220a is still being communicated on the first communications band, it may select the second physical layer 106b and transmit the second frame 220b using the second communications band.

In one exemplary system, the device 101 communicates a frame 220 that is consistent with frames defined by IEEE 802.15.4. A frame 220 communicated by a device 101 that supports multiple physical layers 106 may be the same type of frame used by a device that supports a single physical layer 106. The device 101 may have a single MAC address, LAN address, and IPv6 address, even though it has multiple physical layers 106.

Figure 3:
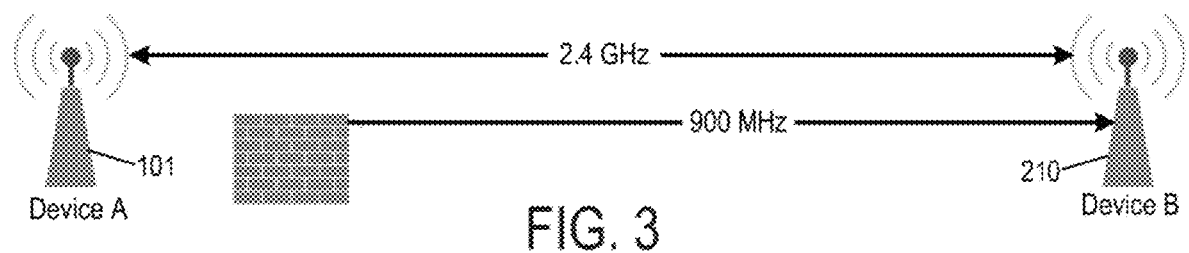
FIG. 3 illustrates an example of dynamically selecting a communications band for transmission of a message, specifically based on availability of communications bands, according to certain implementations described herein.

FIG. 3 illustrates another example of how the communications bands may be used in selection diversity mode to transmit a message to another device, such as a second node 210 in a wireless mesh network 205. In this scenario, device A is configured to primarily communicate with device B using a first communications band, e.g., the 900 MHz communications band. The first communications band may include multiple channels and the devices 101 may use one or more channels to communicate. In one example, the devices 101 use a time slotted channel hopping protocol to communicate where the channels in the hopping sequence are in the respective communications band. Other types of protocols may also be used. The selection of the first communications band as the primary band for devices A and B may be based on factors including, but not limited to, LQI, channel access latency, S/N noise ratio, and channel access time.

When the MAC layer 104 of device A receives data from an upper layer for communication to device B, it communicates with the physical layer 106 for the first communications band. Before initiating a communication on the first communications band, the physical layer 106 may perform a clear channel assessment on a channel in the first communications band. If the physical layer 106 determines that the channel is available, then the physical layer 106 for the first communications band transmits a frame 220 that includes the data from the upper layer to device B. If the physical layer 106 determines that there is contention on the channel or that the channel is otherwise unavailable, then the second communications band is considered. FIG. 3 illustrates that the first communications band is unavailable and that device A considers the second communications band. The physical layer 106 for the second communications band may perform a clear channel assessment on a channel in the second communications band. The first communications band, and the first physical layer 106a, may be unavailable, for instance, when the radio link of that physical layer 106 is poor or when the physical layer 106 is in a period of backoff (i.e., a waiting period after a transmission). In that case, the first physical layer 106a need not be considered for the this particular transmission. If the physical layer 106 determines that the channel in the second communications band is available, then a communication including the data from the upper layer is sent from device A to device B using the second communications band. If both physical layers 106 are available, then the clear channel assessment may be performed on both communications bands at the same time.

Instead of configuring the device 101 to primarily communicate via one of the communications bands, an alternative implementation may consider both communications bands each time there is a communication between device A and device B. For example, when the MAC layer 104 of device A receives data from an upper layer to be communicated to device B, it communicates with both physical layers to determine whether both channels are available. If only one channel is available, then the communications band associated with that channel is used. If both channels are available, then other factors may be considered, such as LQI, S/N ratio, the channel access time, the type of communication, etc. When both communications bands are considered, both channels may be evaluated at approximately the same time to minimize the time needed to select one of the communications bands.

One advantage of having more than one communications band available for communications is that device A does not need to back off and wait until a later time to transmit the communication to device B.

Figure 4:
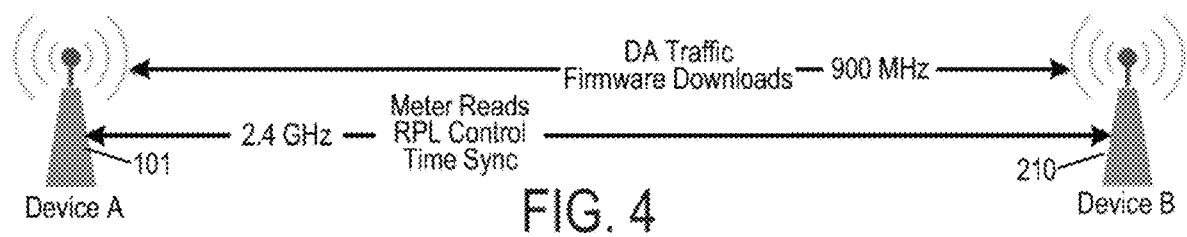
FIG. 4 illustrates an example of dynamically selecting a communications band for transmission of a message, specifically based on traffic type, according to certain implementations described herein.

FIG. 4 illustrates another example of selection diversity mode operation, which is based on traffic type, to transmit a message to another device, such as a second node 210 in a wireless mesh network 205. Different communications bands may be used to communicate different types of traffic. The types of traffic may be based on the time sensitive nature of the data being communicated, the size of the data being communicated, the frequency of the data communications, the priority of the data being communicated, the source or destination of the traffic, or any other factors.

In one example, there are two types of data and two communications bands. The first communications band is reserved for a first type of traffic and the second communications band is reserved for a second type of traffic. When the devices 101 are related to resource metering devices, the first type of traffic may include consumption data based on a meter reading, meter status data, and network maintenance frames 220 (e.g., communications related to routing or synchronization, such as beacons) and the second type of traffic may include firmware updates. In another example, the first type of traffic may be related to normal network traffic and the second type of traffic may be related to large amounts of data transmitted at certain times, such as data provided by distribution automation (DA) devices. Because DA devices monitor various parameters in a mesh network, DA devices may be configured to transmit large amounts of data, and thus, a device 101 may decide to transmit such data (i.e., provided by a DA device) over a communications band deemed to be faster or more reliable.

FIG. 4 illustrates that the first communications band is a 900 MHz band and the second band is a 2.4 GHz band. Since the normal network traffic is sent on a different band than the firmware updates, the normal network traffic is not delayed by the communication of a firmware update. This avoids delays in communicating meter read data or negative impacts to network performance which may occur if the firmware updates interfere with the normal network traffic.

In this scenario, when the MAC layer 104 receives the data from the upper layers, it determines the type of data and sends the data to the physical layer 106 associated with that type of data. The MAC layer 104 may determine the type of data by examining a bitfield parameter (i.e., a flag) included in the data passed to the MAC layer 104 from the upper layers 102. For instance, an upper layer 102 may set the bitfield parameter to indicate the type of data being transmitted. Based on the value of the bitfield parameter, one of the communications bands is selected.

In other scenarios, a single communications stack may provide both long-range and high-speed communications. In one example, the physical layers may operate using the same communications bands. A first physical layer 106 may be used for long-range modes of communication and may communicate using a communications band that includes a frequency range of 902-907 MHz. A second physical layer 106 may be used for high-speed modes of communication may communicate using the same or an overlapping communications band that includes a frequency range of 907-928 MHz.

Alternatively, the physical layers may be configured or tuned to provide connectivity for different link scenarios. For example, a first physical layer 106 may be configured for narrow-band FSK modulation at 433 MHz and may be used for long-range communications, while a second physical layer 106 may be configured for broad-band OFDM modulations at 2.4 GHz and may be used for high-speed communications.

High Reliability Mode

In high reliability mode, the same information is communicated over multiple communications bands to provide redundancy and thus improve the reliability of the network. High reliability mode may be used when it is more important to minimize retries than maximize throughput. In some systems high reliability mode is used to transmit certain types of information or is used when the transmitting device 101 is a certain type of device, e.g., a distribution automation device. For instance, critical data such as high-priority alarms may be transmitted in high reliability mode.

Figure 5:
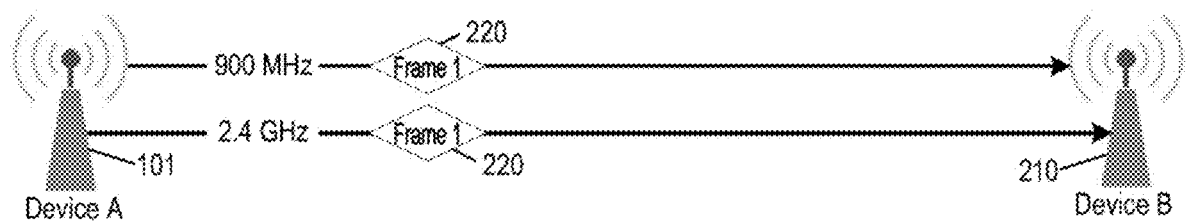
FIG. 5 illustrates an example of transmitting a frame of a message across multiple communications bands, according to certain implementations described herein.

FIG. 5 illustrates that a given frame 220 may be sent multiple times to another device, such as a second node 210 in a wireless mesh network 205. When there are two communications bands, as shown in FIG. 5, the same frame 220 is sent on both bands. The communication on the first communications band and the communication on the second communications band may occur at approximately the same time.

If the time slots for the first communications band and the second communications band are aligned, then the communications may be initiated on both bands at approximately the same time. If the time slots are staggered, then the communications may be initiated at different times so that one communication is initiated on the first communications band during a first time slot for the first communications band and the other communication is initiated on the second communications band during the next time slot for the second communications band.

The MAC layer 104 of device A may send the same data to two different physical layers so that device A sends the same frame 220 to device B using both the first communications band and the second communications band. When device B receives the same frame 220 on both of its physical layers, it discards one copy of the frame 220. For instance, each message may be associated with an identifier. Thus, when device B receives a frame 220 that appears the same as a frame 220 received on another communications band, including the associated message identifier, device B may know that the frame 220 is a duplicate and thus to discard the frame 220.

When one of the physical layers of device B receives the frame 220, it forwards a message to the MAC layer 104 that indicates a frame 220 has been received and the handle for the physical layer 106. The MAC layer 104 examines the handle to determine which physical layer 106 has a frame 220 to process.

When a device 101 uses multiple communications bands to send multiple copies of the same frame 220, there are several acknowledgment options. Under one option the receiving device sends an acknowledgement on the first communications band when the frame 220 is received on the first communications band and sends an acknowledgement on the second communications band when the frame 220 is received on the second communications band. The transmitting device 101 may confirm a successful transmission once it receives one of the acknowledgments. Under another option, the receiving device only sends one acknowledgement regardless of whether the frame 220 is received on only one of the communications bands or on both of the communications bands. In one example where the communications bands are operating using different data rates, the receiving device sends an acknowledgement on the communications band that received the frame 220 first. So long as the frame 220 is acknowledged, the transmitting device 101 proceeds to process the next frame 220 in its transmit queue. If the frame 220 is not acknowledged, then the transmitting device 101 resends the frame 220.

High Throughput Mode

Figure 6:
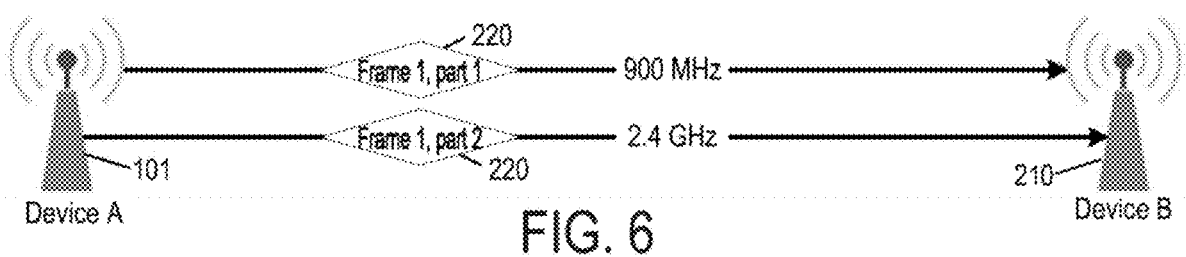
FIG. 6 illustrates an example of transmitting a first portion of a frame on the first communications band and a second portion of the frame on the second communications band, according to certain implementations described herein.

In high throughput mode, a device 101 sends different portions of a frame 220 on different communications bands. FIG. 6 illustrates that a first portion of a frame 220 may be sent on the first communications band and a second portion of the frame 220 may be sent on the second communications band to another device, such as a second node 210 in a wireless mesh network 205, so that both portions are being sent at approximately the same time.

When the MAC layer 104 of device A has a frame 220 ready to transmit, it divides the frame data and sends a first portion of the data to a first one of the physical layers and sends a second portion of the data to a second one of the physical layers. Some implementations utilize a standard transmission protocol, such as Internet Protocol v6 and Low-Power Wireless Personal Area Networks (6LoWPAN), that includes a technique for recognizing and automatically recombining messages that have been fragmented. Thus, upon receiving portions of an original message, device B is configured to generate the original message from the various portions received.

Although the foregoing scenarios describe that one device 101 uses multiple communications bands for transmitting, a device 101 may use one communications band for transmitting and one for receiving.

Example Method

Figure 7:
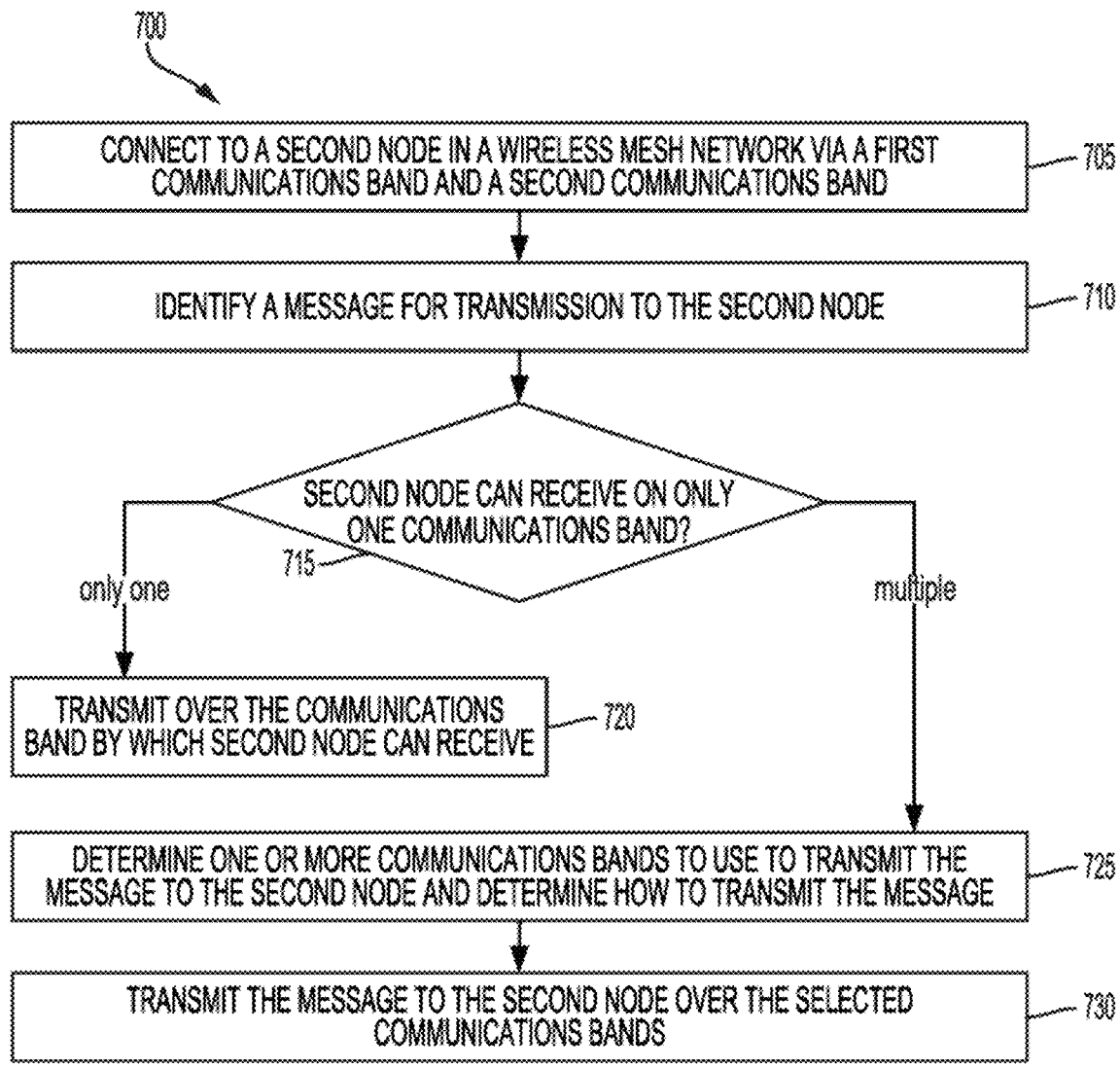
FIG. 7 is a flow diagram of a method of transmitting a message to a second node in a wireless mesh network, according to certain implementations described herein.

FIG. 7 is a flow diagram of a method 700 of transmitting a message to a second node 210 in a wireless mesh network, according to certain implementations described herein. In some implementations, a device 101 configured to communicate over a wireless mesh network using two or more communications bands may use this method 700 or similar to transmit messages.

At block 705, the device connects to a second node 210 in a wireless mesh network by way of a first communications band and a second communications band, such that the node is configured to communicate with the second node 210 over both the first communications band and the second communications band. For instance, when the device 101 joins the mesh network, the device 101 may connect with the second node 210 by way of the first and second communications bands, such as by listening to the second node 210 over the first and second communications bands.

At block 710, the device 101 identifies a message for transmission to the second node 210. For instance, in the regular course of operation, the device 101 may occasionally have messages to transmit. Specifically, for instance, if the device 101 is a utility meter that measures consumption data, the device 101 may occasionally identify a collection of consumption data for transmission to a second node 210.

At decision block 715, the device 101 determines whether the second node 210 is capable of receiving the message by way of more than a single communications band useable by the device 101. For instance, the device 101 determines whether the second node 210 can receive on both the first communications band and the second communications band. It will be understood that, if the device 101 is capable of utilizing more than two communication bands, then the device 101 may determine which of the device's available communications bands the second node 210 can use to receive the message.

If the second node 210 is deemed configured to receive communications over only one of the device's communications bands, then at block 720, the device 101 transmits the message by way of the communications band over which the second node 210 is configured to receive messages. For instance, the second node 210 is deemed to be listening over the first communications band but not the second, then the device 101 may transmit the message to the second node 210 over the first communications band and not over the second. However, if the second node 210 is deemed to be listening over the second communications band and not the first, then the device 101 may transmit the message to the second node 210 over the second communications band and not over the first. As described above, the device 101 may maintain a record of communications bands known to be useable by peer devices, and the device 101 may thus determine which communications bands the peer device is configured to use based on this record.

However, if the second node 210 is deemed to be able to use both the first communications band and the second communications band, then at block 725, the device 101 dynamically determines a communications band to use, including potentially using two or more communications bands or only a single communications band, and further determines how to transmit the message. As described in detail above, for instance, the device 101 may select a transmission mode, such as selection diversity mode, high reliability mode, or high throughput mode. The rules of the selected mode may then determine which one or more communications bands to use and how to use those communications bands, such as whether to send each frame 220 of the message over both communications bands or whether to distribute frames 220 of the message across the communications bands.

At block 730, the device 101 transmits the message over the selected one or more communications bands. For example, if the device 101 has decided to transmit the message across both communications bands using high reliability mode, than the device 101 may transmit each frame 220 of the message across each communications band. For another example, if the device 101 is in selection diversity mode and has determined that the first communications band is currently more suitable for transmitting the message (e.g., has a stronger radio link), then the device 101 may transmit the message over the first communications band. For yet another example, if the device 101 has decided to transmit the message across both communications bands using high throughout mode, than the device 101 may split the message into two sets of frames 220 and may transmit one set of frames 220 over the first communications band and another set of frames 220 over the second communications band. It will be understood that various techniques for transmitting the message are within the scope of this disclosure.

General Considerations

Numerous specific details are set forth herein to provide a thorough understanding of the claimed subject matter. However, those skilled in the art will understand that the claimed subject matter may be practiced without these specific details. For example, the devices are not limited to two communications bands. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more examples of the present subject matter. Any suitable programming, scripting, or other type of language or combinations of languages may be used to implement the teachings contained herein in software to be used in programming or configuring a computing device.

Examples of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific examples thereof, it will be appreciated that those skilled in the art, upon attaining an understanding of the foregoing, may readily produce alterations to, variations of, and equivalents to such examples. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method of transmitting a message over a wireless mesh network comprising a plurality of second nodes connected together:

connecting, by a node, to a second node in the wireless mesh network by way of a first communications band and a second communications band, wherein the node is configured to communicate with the second node over both the first communications band and the second communications band;

identifying, by the node, a message for transmission to the second node;

determining, by the node, that the second node is capable of receiving the message by way of the first communications band and is capable of receiving the message by way of the second communications band; and dynamically determining, by the node, a selected communications band, from the first communications band and the second communications band, to use to transmit the message to the second node over the wireless mesh network; and transmitting, by the node, the message to the second node over the selected communications band.

2. The method of claim 1, wherein:

the node is configured to transmit the message over the first communications band by way of a first physical layer in a communications stack of the node:

the node is configured to transmit the message over the second communications band by way of a second physical layer in a communications stack of the node; and the first physical layer and the second physical layer both service a common media access control (MAC) layer.

3. The method of claim 2, wherein the first physical layer comprises a first radio configured to transmit over the first communications band, wherein the second physical layer comprises a second radio configured to transmit over the second communications band, and wherein the first radio and the second radio share a MAC address.

4. The method of claim 2, further comprising:
maintaining a first data structure corresponding to the first physical layer and a second data structure corresponding to the second physical layer,
wherein the first physical layer passes to the MAC layer a pointer to the first data structure to indicate receipt of a frame at the first physical layer.

5. The method of claim 1, wherein:
dynamically determining the selected communications band comprises selecting both the first communications band and the second communications band; and
transmitting the message to the second node over the selected communications band comprises:
splitting the message into a first frame and a second frame;
transmitting the first frame to the second node over the first communications band; and
transmitting the second frame to the second node over the second communications band.

6. The method of claim 1, wherein:
dynamically determining the selected communications band comprises selecting both the first communications band and the second communications band; and
transmitting the message to the second node over the selected communications band comprises:
transmitting a complete version of the message over the first communications band; and
transmitting the complete version of the message over the second communications band.

7. The method of claim 1, wherein dynamically determining the selected communications band comprises dynamically selecting the first communications band as the selected communications band based on determining that the first communications band is able to transmit the message to the second node with a lower air time as compared to the second communications band.

8. The method of claim 1, wherein dynamically determining the selected communications band comprises dynamically selecting the first communications band as the selected communications band based on determining that the first communications band has a stronger radio link as compared to the second communications band.

9. The method of claim 1, wherein the node is a utility meter comprising a communications stack having a first physical layer and a second physical lay configured to service a common MAC layer.

10. A node comprising
a first physical layer comprising a first radio configured to communicate with a second node over a first communications band;
a second physical layer comprising a second radio configured to communicate with the second node over a second communications band;
a media-access control layer (MAC) layer serviced by both the first physical layer and the second physical layer, wherein the first radio and the second radio have a common MAC address;
a processor configured to execute computer-readable instructions;
a memory configured to store the computer-readable instructions that, when executed by the processor, cause the processor to perform operations comprising:
connecting to the second node by way of the first communications band and the second communications band, wherein the node is configured to communicate with the second node over both the first communications band and the second communications band;
identifying a message for transmission to the second node;
determining that the second node is capable of receiving the message by way of the first communications band and is capable of receiving the message by way of the second communications band; and
dynamically selecting the first communications band, from the first communications band and the second communications band, to use to transmit the message to the second node; and
transmitting, by the node, the message to the second node over the first communications band using the first radio.

11. The node of claim 10, the operations further comprising:
maintaining a first data structure corresponding to the first physical layer and a second data structure corresponding to the second physical layer,
wherein the first physical layer passes to the MAC layer a pointer to the first data structure to indicate receipt of a frame at the first physical layer.

12. The node of claim 10, the operations further comprising:
dynamically selecting the second communications band, from the first communications band and the second communications band, to use to transmit the message to the second node;
splitting the message into a first frame and a second frame;
transmitting the second frame to the second node over the second communications band,
wherein transmitting the message to the second node over the first communications band comprises transmitting the first frame to the second node over the first communications band.

13. The node of claim 10, the operations further comprising:
dynamically selecting the second communications band, from the first communications band and the second communications band, to use to transmit the message to the second node; and
transmitting the message to the second node over the second communications band,
wherein a portion of the message is transmitted to the second node over both the first communications band and the second communications band.

14. The method of claim 1, wherein dynamically selecting the first communications band comprises determining that the first communications band is able to transmit the message to the second node with a lower air time as compared to the second communications band.

15. The method of claim 1, wherein dynamically selecting the first communications band comprises determining that the first communications band has a stronger radio link as compared to the second communications band.

16. The method of claim 1, wherein the node is a utility meter.

17. A non-transitory computer-readable storage medium having program instructions embodied thereon, the program instructions executable by a processor to cause the processor to perform a method for communicating between nodes of a wireless mesh network, comprising:
- connecting, by a node, to a second node in the wireless mesh network by way of a first communications band and a second communications band, wherein the node is configured to communicate with the second node over both the first communications band and the second communications band;
- identifying, by the node, a message for transmission to the second node;
- determining, by the node, that the second node is capable of receiving the message by way of the first communications band and is capable of receiving the message by way of the second communications band; and
- dynamically determining, by the node, a selected communications band, from the first communications band and the second communications band, to use to transmit the message to the second node over the wireless mesh network; and
- transmitting, by the node, the message to the second node over the selected communications band.

18. The non-transitory computer-readable storage medium of claim 17, wherein:
- the node is configured to transmit the message over the first communications band by way of a first physical layer in a communications stack of the node:
- the node is configured to transmit the message over the second communications band by way of a second physical layer in a communications stack of the node; and
- the first physical layer and the second physical layer both service a common media access control (MAC) layer.

19. The non-transitory computer-readable storage medium of claim 18, wherein the first physical layer comprises a first radio configured to transmit over the first communications band, wherein the second physical layer comprises a second radio configured to transmit over the second communications band, and wherein the first radio and the second radio share a MAC address.

20. The non-transitory computer-readable storage medium of claim 18, the method further comprising:
- maintaining a first data structure corresponding to the first physical layer and a second data structure corresponding to the second physical layer,
- wherein the first physical layer passes to the MAC layer a pointer to the first data structure to indicate receipt of a frame at the first physical layer.

* * * * *